United States Patent [19]

Schuman

[11] 3,790,182
[45] Feb. 5, 1974

[54] TOOLHOLDER
[75] Inventor: Ralph Henry Schuman, Euclid, Ohio
[73] Assignee: The Warner & Swasey Company, Cuyahoga, Ohio
[22] Filed: June 5, 1972
[21] Appl. No.: 259,736

[52] U.S. Cl. ................ 279/43, 279/1 B, 279/50
[51] Int. Cl. .................................... B23b 31/20
[58] Field of Search ... 279/43, 1 B, 37, 50, 57, 1 A, 279/42, 48, 1 TS, 82

[56] References Cited
UNITED STATES PATENTS

| | | | |
|---|---|---|---|
| 3,171,663 | 3/1965 | Stark | 279/1 TS |
| 3,599,996 | 8/1971 | Holt | 279/1 B |
| 3,240,520 | 3/1966 | Dailey et al. | 279/37 X |
| 3,466,971 | 9/1969 | Meyer | 279/37 X |
| 3,633,931 | 1/1972 | Biltz | 279/1 B X |
| 3,672,692 | 6/1972 | Fauth | 279/1 B X |

Primary Examiner—Andrew R. Juhasz
Assistant Examiner—Z. R. Bilinsky
Attorney, Agent, or Firm—J. Herman Yount, Jr. et al.

[57] ABSTRACT

An improved toolholder includes a collet which engages a presetting or adjusting nut on the shank of a tool to retain the tool against movement relative to a spindle. The collet has jaws with gripping surfaces which are disposed in abutting planar engagement with a conical chamfer surface on an axially outer face of the presetting nut when the collet is in a closed condition. The collet is operated between the open and closed conditions by a sleeve having camming surfaces which are pressed against outer surfaces of the collet jaws under the influence of a biasing spring when the collet is in the closed condition. In one specific embodiment of the invention, an ejector is provided to move the tool outwardly as the collet is opened. The collet may be retained in the open condition by a locking assembly which is automatically released upon insertion of a tool into the collet.

12 Claims, 7 Drawing Figures

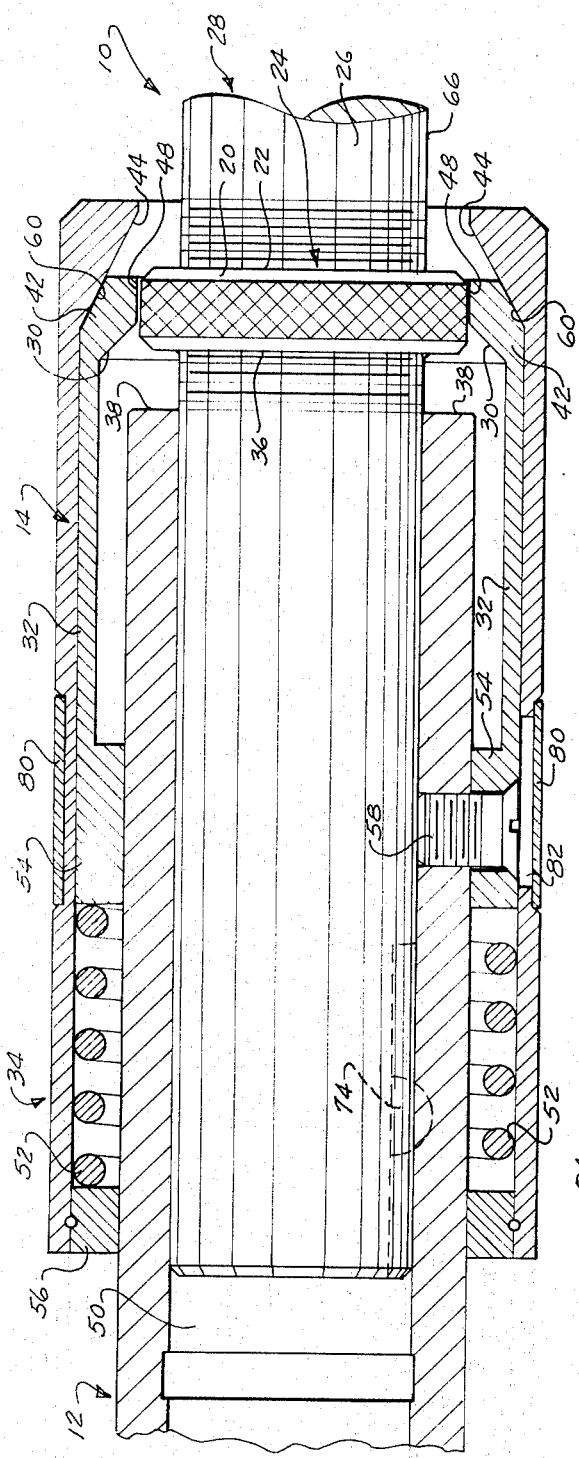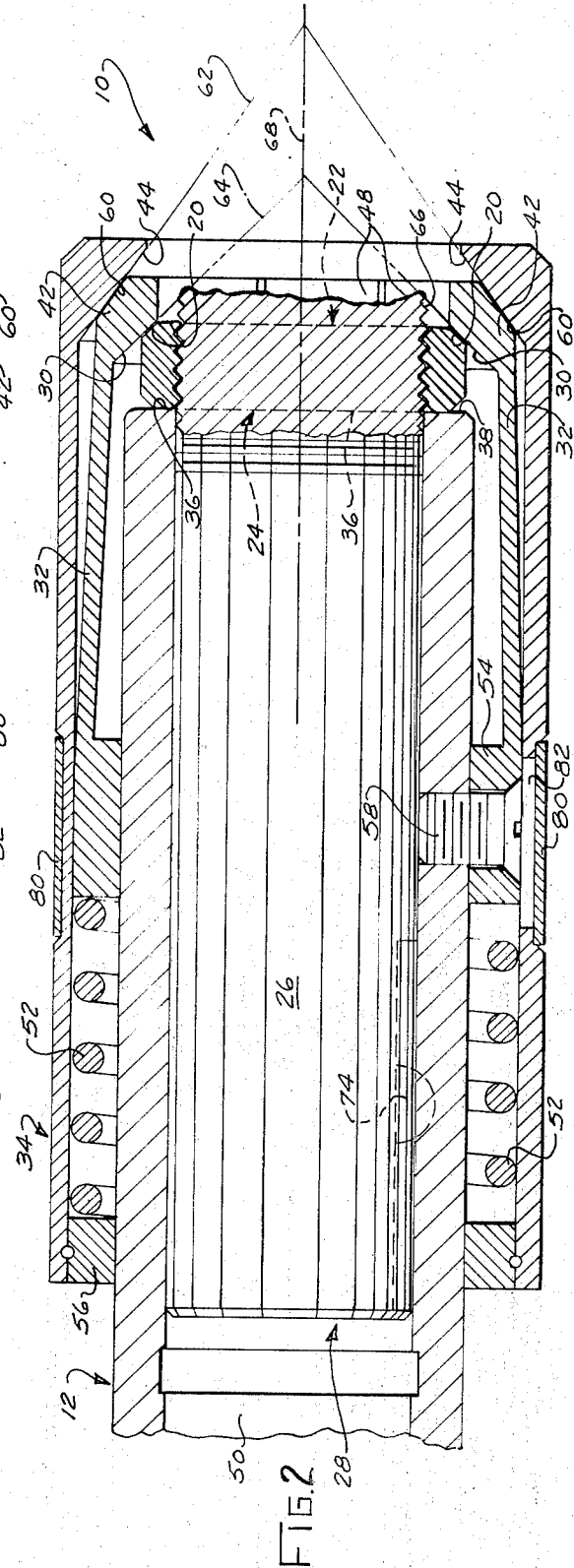
FIG.1
FIG.2

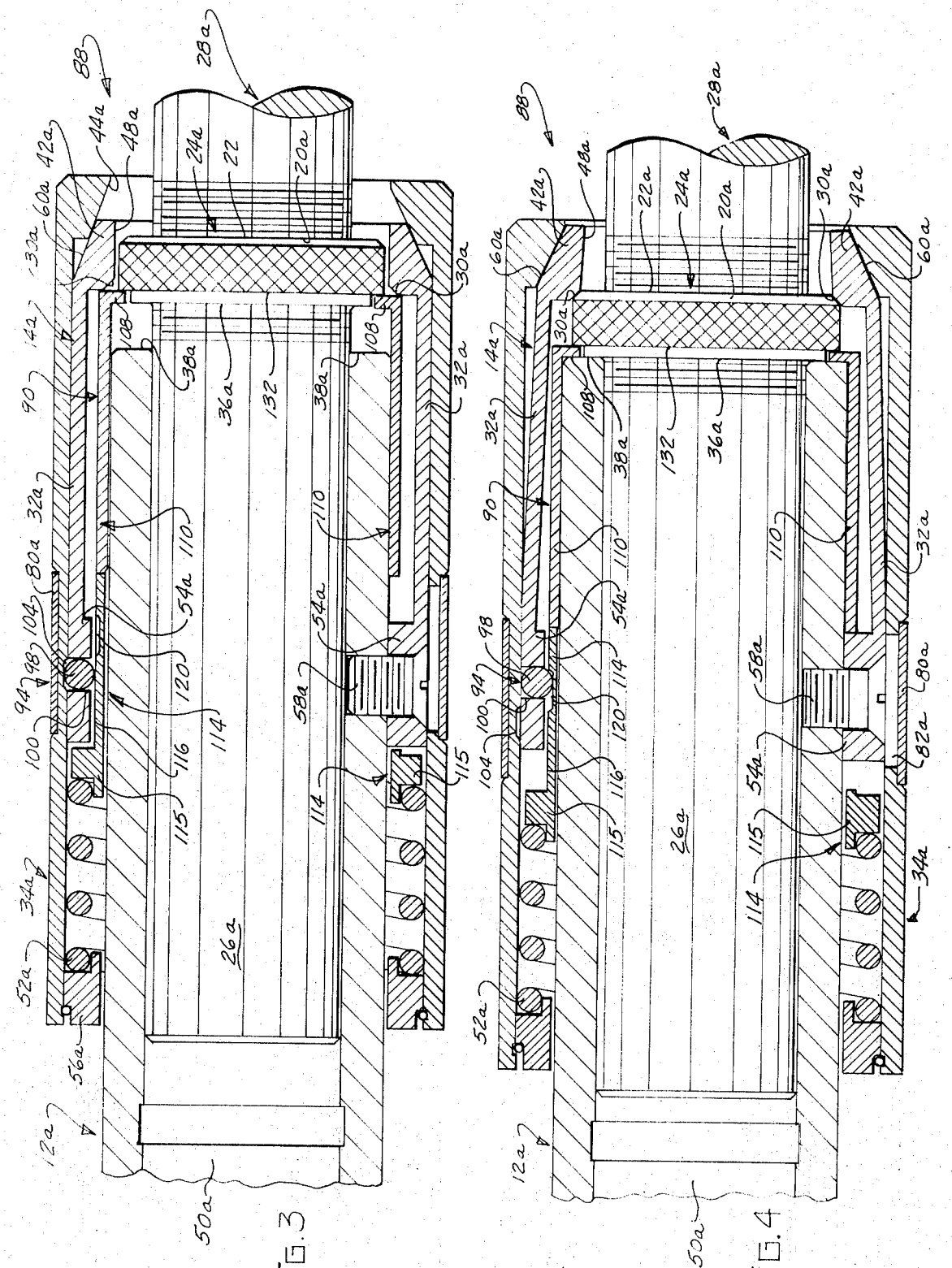

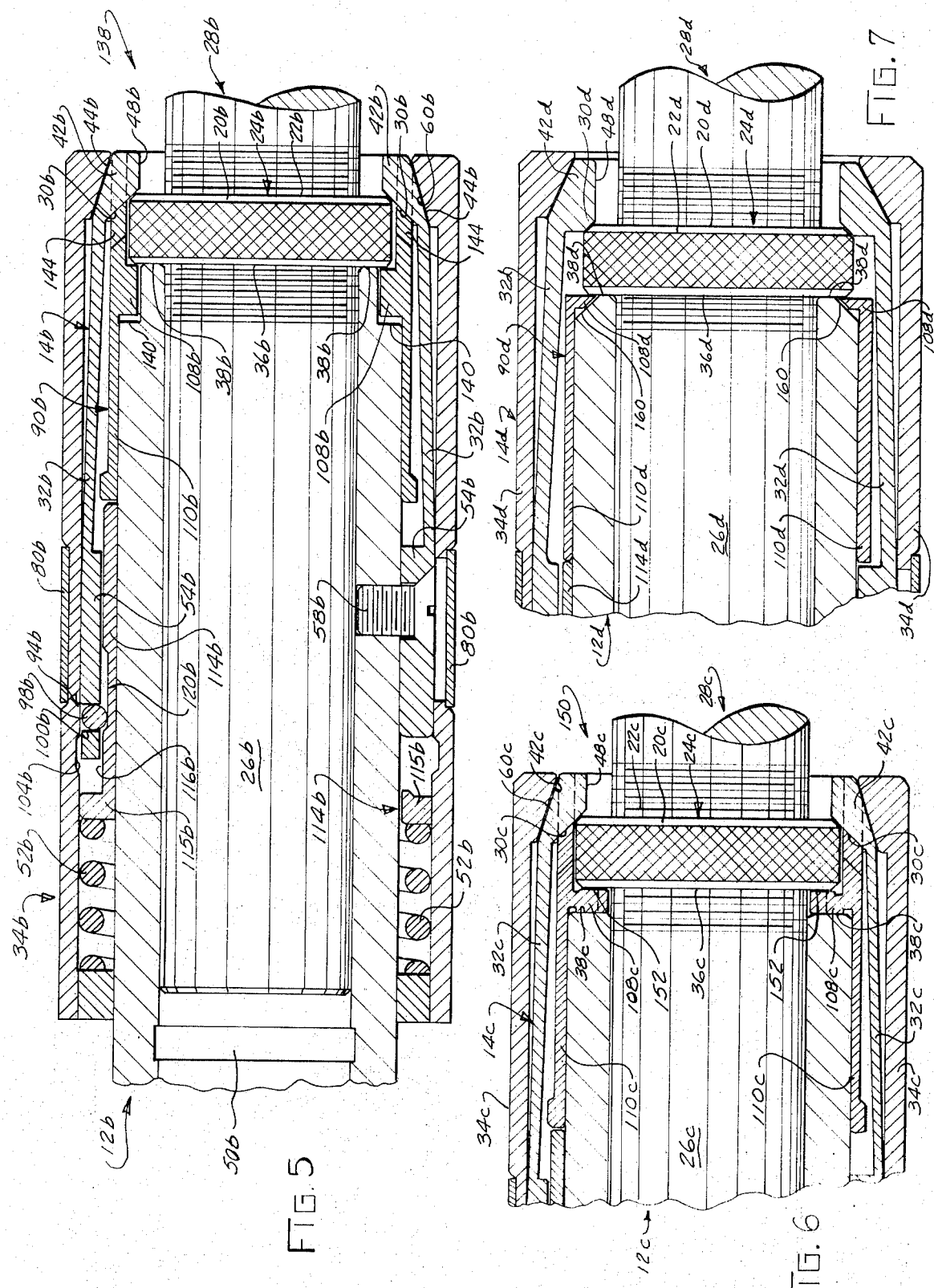

TOOLHOLDER

BACKGROUND OF THE INVENTION

This invention relates generally to a toolholder and more specifically to a toolholder which engages a presetting nut on the shank of a tool to retain the tool against movement relative to a spindle.

There are many known toolholders which hold a presetting or adjusting nut on the shank of a tool in abutting engagement with a reference surface formed on a spindle. One of these known toolholders includes a plurality of retaining balls which engage a groove formed in a collar on an axially inner side of the presetting nut in the manner illustrated in U.S. Pat. No. 3,473,815. To facilitate removal of the tool from the spindle at the end of a machining operation, an ejector has been provided in association with this known toolholder in the manner shown in U.S. Pat. No. 3,633,931. During continued use of either one of these known toolholders, the retaining balls may tend to wear so that the tool is not maintained in the desired position relative to the spindle during a machining operation. Wearing of the retaining balls is promoted by the fact that they have essentially point contact with the sides of a groove in the presetting nut.

Other known types of toolholders include collet chucks which engage the shank of a tool in the manner disclosed in U.S. Pat. Nos. 2,989,316 and 3,171,664. The jaws of these collets have gripping surfaces which engage relatively large areas of a tool to thereby eliminate wear problems which may be incurred with the use of retaining balls. However the collets of these known toolholders may be difficult to mount on the spindles of many existing machine tools. In addition, some of these known collet type toolholders do not provide for engagement of a presetting nut with a fixed reference surface.

SUMMARY OF THE PRESENT INVENTION

The present invention provides a collet type toolholder which can be adapted for use with the spindle on an existing machine tool with a minimum of effort. The toolholder includes a collet having resilient fingers which grippingly engage a presetting or adjusting nut on a shank of a tool. In accordance with one feature of the invention, the collet fingers have gripping surfaces which engage a conical chamfer on an axially outer face of the presetting nut snd press the presetting nut against a reference surface to retain a tool against axially movement relative to the spindle during a machining operation. On certain embodiments of the invention, an ejector is provided for moving the tool outwardly from the spindle upon opening of the collet. In addition, a locking device may be provided to retain the collet in the open position until another tool is positioned within the collet.

Accordingly, it is an object of this invention to provide a new and improved toolholder which can be used with existing machine spindles and tools with a minimum amount of change in the construction of either of them.

Another object of this invention is to provide a new and improved toolholder having a collet which grippingly engages a chamfer or truncated conical surface on an axially outer face of a presetting nut on the shank of a tool when the collet is closed.

Another object of this invention is to provide a new and improved toolholder having a collet with gripping surfaces which are disposed in planar abutting engagement with an axially outer face of a presetting nut on the shank of a tool when the collet is closed.

Another object of this invention is to provide a new and improved toolholder having a collet with a plurality of resilient fingers which are deflected inwardly into gripping engagement with a presetting nut on the shank of a tool when the collet is closed to retain the tool against axial movement relative to a spindle.

BRIEF DESCRIPTION OF THE DRAWINGS

The foregoing and other objects and features of the present invention will become more apparent upon a consideration of the following description taken in connection with the accompanying drawings wherein:

FIG. 1 is a sectional view illustrating the relationship between a spindle, tool, and collet of a toolholder constructed in accordance with the present invention, the collet being shown in an open condition;

FIG. 2 is a sectional view, generally similar to FIG. 1, illustrating the collet in a closed condition in which it grippingly engages a chamfer on an axially outer face of a presetting nut on the shank of the tool of FIG. 1;

FIG. 3 is a sectional view, generally similar to FIG. 1, illustrating another toolholder constructed in accordance with the present invention and having a tool ejector, the toolholder being shown locked in an open condition;

FIG. 4 is a sectional view illustrating the toolholder of FIG. 3 in a closed condition gripping an outer face of a presetting nut having an inner face which has been cut-away to receive an outer end portion of the tool ejector;

FIG. 5 is a sectional view, similar to FIG. 4, of a toolholder constructed in accordance with the present invention and having a tool ejector which is received in a cut-away outer end portion of the spindle when the toolholder is in the illustrated closed condition;

FIG. 6 is a sectional view of another embodiment of the invention in which the tool ejector is disposed between the outer end of the spindle and a presetting nut on the shank of a tool when the toolholder is in the closed condition; and FIG. 7 is a sectional view of an embodiment of the invention in which an outer end portion of the tool ejector is received in a beveled or chamfered outer end of the spindle when the tool-holder is in the illustrated closed condition.

DESCRIPTION OF SPECIFIC PREFERRED EMBODIMENTS OF THE INVENTION

A toolholder 10 constructed in accordance with the present invention is illustrated in FIG. 1 in association with a spindle 12 of a known machine tool. The toolholder 10 includes a collet 14 which is operable from the open condition of FIG. 1 to the closed condition of FIG. 2 to grippingly engage a chamfer or truncated conical surface 20 on an axially outer face 22 of a presetting or adjusting nut 24 disposed on a shank 26 of a known tool 28. When the collet 14 is in the closed condition of FIG. 2, gripping surfaces 30 on resiliently deflectable collet fingers or jaws 32 are pressed against the chamfer 20 by an actuator sleeve 34 to urge an axially inner surface 36 on the adjusting nut 24 against a reference surface 38 formed on an outer end of the spindle 12.

In accordance with a well known practice, the nut 24 is set to a predetermined position on the threaded shank 26 of the tool 28 prior to initiation of a machining operation. The tool-holder 10 is then opened by manually gripping the cylindrical actuator sleeve 34 and moving the actuator sleeve axially outwardly relative to the spindle 12, that is from the position shown in FIG. 2 to the position shown in FIG. 1. During this movement of the actuator sleeve 34, the collet fingers 32 flex outwardly and outer end portions 42 of the collet fingers slide along a truncated conical camming surface 44 formed on an outer end portion of the cylindrical sleeve 34. When the collet 14 is in the open condition of FIG. 1, arcuate inner surfaces 48 on the outer end portions 42 of the collet fingers 32 cooperate to define a circular opening through which the presetting nut 24 can pass (see FIG. 1) as the shank 26 of the tool 28 is inserted into a cylindrical socket 50 in the spindle 12.

Once the annular inner surface 36 on the presetting nut 24 has moved into abutting engagement with the annular reference surface 38 on the end of the spindle 12, the tool 28 extends outwardly of the spindle 12 by a distance which is determined by the position of the presetting nut 24 on the shank 26. The toolholder 10 is then closed to firmly grip the tool 28 and retain it against movement relative to the spindle 12 during a machining operation. To effect operation of the toolholder 10 to the closed condition, the sleeve 34 is released. Releasing the sleeve 34 enables it to move toward the left (as viewed in FIG. 1) under the influence of a spring 52 which acts between a cylindrical base section 54 of the collet 14 and an annular end block or member 56 fixed to sleeve 34 which is slidably disposed on the spindle 12. Since the base section 54 of the collet 14 is fixedly secured to the spindle 12 by a fastener 58, the compressed spring 52 moves the sleeve 34 axially inwardly from the position shown in FIG. 1 toward the position shown in FIG. 2.

As the sleeve 34 moves inwardly toward the closed position of FIG. 2, the collet 14 is closed. Thus, the outer end portions 42 of the resilient collet fingers or jaws 32 are deflected inwardly by a camming action between the truncated conical surface 44 on the outer end portion of the sleeve 34 and arcuate surfaces 60 formed on the end portions of the gripper fingers 32. It should be noted that the surfaces 60 are disposed in a circular array on the gripper fingers 32 and define a truncated portion of a cone 62 (FIG. 2) having the same configuration as a cone extending through the truncated conical inner surface 44 on the sleeve 34.

As the outer end portions 42 of the collet fingers 32 are cammed inwardly by the sleeve 34 to close the collet 14, the truncated conical gripping surfaces 30 on the collet fingers 32 are pressed against the chamfer 20 on the axially outer face 22 of the presetting nut 24 (FIG. 2). The angularly disposed surfaces 30 press the axially inner surface 36 of the presetting nut 24 firmly against the reference surface 38 on the spindle 12. It should be noted that the width of the chamfer 20 may vary on different nuts. However, the width of the gripping surfaces 30 is sufficient to accommodate any normal variation in chamfer width. The width of the surfaces 30 also compensates for any wearing of the chamfer on the adjusting nut 24.

When the collet 14 is in the closed condition of FIG. 2, the gripping surfaces 30 on the outer end portions of the collet fingers 32 are disposed in an annular array and define a truncated portion of a cone, indicated in dashed lines at 64 in FIG. 2. The cone 64 is coincident with a cone extending through the surface of the chamfer 20 to provide for planar abutting engagement between the inner surface 30 of the gripper fingers 32 and the outer face 22 of the presetting nut 24 throughout the surface area of the chamfer 20. The cone 64 intersects the cylindrical plane of an outer surface 66 of the tool shank 26 outwardly of the presetting nut 24 and is disposed in a coaxial relationship with a longitudinal central axis 68 of the spindle 12, tool 28 and cone 62. Since the gripping surfaces 30 are disposed in abutting planar engagement with the chamfer surface 20 throughout its width, wear inducing stress concentrations on the gripper fingers 30 and on the chamfer surface 20 are avoided.

During machining operations, the collet fingers 32 are maintained in secure gripping engagement with the presetting nut 24 to hold the tool 28 against axial movement relative to the spindle 12. This holding action on the part of the collet 14 is promoted by the spring 52 which urges the cylindrical actuator sleeve 34 toward the left (as viewed in FIG. 2) to thereby cause the camming surface 44 on the inside of the sleeve to continuously press the outer end portions 42 of the collet fingers 32 against the presetting nut 24. The tool shank 26 is retained against rotational movement relative to the spindle 12 by a known locking key 74 which engages a slot formed in the inner end portion of the tool shank 26.

When the tool 28 is to be removed from the toolholder 10, the sleeve 34 is moved to the right from the position shown in FIG. 2 to the position shown in FIG. 1 against the influence of the biasing spring 52. During this movement of the sleeve 34, the resilient collet fingers 32 flex outwardly to open the collet 14. Once the collet 14 has been opened, the tool 26 can be manually withdrawn and another tool inserted in its place.

In accordance with one aspect to this present invention, the toolholder 10 can be mounted on the spindle 12 of an existing machine tool with a minimum of changes in the construction of the spindle. Thus after the hole has been drilled and tapped for the fastener 58, the toolholder 10 is mounted on the spindle by merely sliding the sleeve 34, collet 54 and spring 52 into coaxial positions on the spindle 12. A closure band or chipguard 80 is then moved away from an access opening 82 to enable the fastener 58 to be installed. It should be noted that the toolholder 10 can be used with known or standard tools 28 without modifying the presetting nuts 24.

It is contemplated that it may be desirable to partially eject the tool 28 from the spindle socket 50 upon opening of the collet 14. In addition, it is contemplated that the insertion of a tool into the toolholder would be facilitated if the actuator sleeve 34 was held in the open position of FIG. 1 against the influence of the biasing spring 52. Accordingly in the embodiment of the invention illustrated in FIGS. 3 and 4, a toolholder 88 is provided with a tool ejector 90 which automatically moves a tool outwardly of the spindle socket when the toolholder is operated from the closed condition of FIG. 4 to the open condition of FIG. 3. In addition, a locking or retaining assembly 94 is provided to retain the actuator sleeve in the open position of FIG. 3 against the influence of the biasing spring. Since the toolholder 88 of FIGS. 3 and 4 includes many elements of substantially the same construction as elements of the toolholder 10 of FIGS. 1 and 2, numerals similar to those utilized in connection with the embodiment of FIGS. 1 and 2 will be utilized to identify the elements of the toolholder 88, the suffix letter "a" being associated with the numerals of FIGS. 3 and 4 to avoid confusion.

When the toolholder 88 is in the open condition of FIG. 3, the locking assembly 94 holds the cylindrical actuator sleeve 34a against axial movement relative to the spindle 12a under the influence of the spring 52a. The locking assembly 94 includes one or more retaining balls 98 which are disposed in holes 100 arranged in the base section 54a of the collet 14a. When toolholder 88 is in the open condition of FIG. 3, the retaining balls 98 extend into a circular groove 104 in the sleeve 34a. Since the base section 54a of the open collet 14a is held against axial movement relative to the spindle 12a by the fastener 58a, the retaining balls 98 engage the outer side of the groove 104 to hold the actuator sleeve 34a against axial movement to the left (as viewed in FIG. 3) under the influence of the spring 52a.

As the shank 26a of the tool 28a is moved into the socket 50a in the spindle 12a, an inner face of the presetting nut 24a engages an annular flange 108 on the outer end of a cylindrical ejector sleeve 110. Continued inward movement of the tool 28a causes the ejector sleeve to slide axially along the spindle 12a from the position shown in FIG. 3 toward the position shown in FIG. 4. This inward movement of the ejector sleeve 110 moves a generally cylindrical latch slide 114 inwardly against the influence of the biasing spring 52a which engages a circular inner flange 115 on the latch slide. Although the flange 115 is continuous, the cylindrical latch slide 114 is slotted to receive the fastener 58a.

During initial inward movement of the latch slide 114, the retaining balls 98 are held in the groove 104 by a cylindrical outer surface 116 of the latch slide. However when the inner surface 36a of the presetting nut 24a has closely approached the reference surface 38a, a circular groove 120 in the latch slide 114 moves into radial alignment with the retaining balls 98. When this occurs, the retaining balls are cammed into the groove 120 under the influence of the side surfaces of the groove 104 in the actuator sleeve 34a. The retaining balls 98 are dimensioned such that when they have entered the groove 120, they are disposed radially inwardly of the sleeve 34a so that it is released for movement under the influence of the spring 52a.

When the actuator sleeve 34a is released by movement of the retainer balls 98 out of the groove 104 in the actuator sleeve and into the groove 120 in the latch slide 114, the spring 52a moves the actuator sleeve toward the left from the position shown in FIG. 3 to the position shown in FIG. 4. As the actuator sleeve 34a moves toward the left (as viewed in FIG. 3) the gripping surfaces 30a on the outer end portions 52a the resiliently deflectable collet fingers 32a are moved into abutting planar engagement with the truncated conical chamfer surface 20a on the outer face 22a of the presetting nut 24a. The collet fingers 32a then grip the nut 24a in the same manner previously explained in connection with the embodiment of the invention illustrated in FIGS. 1 and 2.

In accordance with one feature of this embodiment of the invention, the ejector assembly 90a automatically moves the tool 28a outwardly relative to the spindle 12a upon opening of the collet 14a. Thus when the machine tool 28a is to be replaced, the actuator sleeve 34a is moved toward the right from the position shown in FIG. 4 toward the position shown in FIG. 3. During this rightward movement of the sleeve 34a, the retaining balls 98 engage the inner side surface of the groove 120 to hold the latch slide 114 against outward movement under the influence of the biasing spring 52a. However, when the cylindrical groove 104 in the actuator sleeve 34a has been moved into radial alignment with the retaining balls 98, the inner side of the groove 120 cams the balls out of this groove and into the groove 104. This radial movement of the retaining balls 98 releases the latch slide 114 for axially outward movement relative to the spindle 12a.

When the latch slide 114 is released, the spring 52a moves the latch slide and ejector sleeve 110 outwardly relative to the spindle 12a to partially eject the tool 28a from the spindle socket 50a. Thus, as the latch slide 114 moves from the position shown in FIG. 4 toward the position shown in FIG. 3, the annular flange 108 on the outer end of the ejector sleeve 110 engages an annular radially extending surface 132 formed on a cutaway portion of the presetting nut 24a and moves the presetting nut outwardly through an opening defined by the outer end portions 42a of the now opened collet 14a. When the latch slide 114 reaches the position shown in FIG. 3, the retaining balls 98 are held in the groove 104 by the latch slide 114 to maintain the toolholder 88 in the opened condition.

In the embodiment of the invention illustrated in FIGS. 3 and 4, a groove is cut in the axially inner face of the presetting nut 24a to receive the ejector flanges 108 and form the surface 132. It is contemplated that under certain conditions it may be desirable to utilize standard or regular presetting nuts, that is nuts which have not been cut-away at their inner faces and have the configurations shown in FIGS. 1 and 2 rather than the configuration shown in FIGS. 3 and 4. In such a case, it is contemplated that a groove could be formed in the outer end portion of the spindle to receive the ejector flanges. Accordingly, in the embodiment of the invention illustrated in FIG. 5 a tool-holder 138 is shown in connection with a spindle having a cylindrical groove 140 cut in its outer end portion. Since the toolholder 138 of FIG. 5 includes many components having the same general construction and function as the toolholder 88 of FIGS. 3 and 4, similar components have been designated with similar numerals, the suffix letter "b" being added to the numerals associated with FIG. 5 to avoid confusion.

The ejector sleeve 110b includes flanges 108b which engage the inner face surface 36b of the presetting nut 24b. When the actuator sleeve 34b is moved to the right from the position shown in FIG. 5, the retaining balls 98b enter the circular groove 104b in the sleeve 34b and release the latch slide 114b for outward movement under the influence of the spring 52b. As the latch slide 114b is moved outwardly, the ejector flanges 108b on the ejector sleeve 110b press against the inner face 36b of the presetting or adjusting nut 34b to push the tool 28b outwardly relative to the spindle socket 50b.

In the embodiment of the invention illustrated in FIG. 5, a plurality of blocking fingers or sections 144 are connected with the ejector sleeve 110b and extend outwardly from the annular ejector flange 108b. The blocking sections 144 are disposed in slots or spaces between the adjacent collet fingers 32b and prevent the passage of chips and other foreign matter between the collet fingers into the actuating mechanism when the collet 14b is closed.

With the exception of the groove 140 for receiving the ejector flange 108b when the collet 14b is in the closed condition of FIG. 5, the toolholder 138 is of the same general construction as the toolholder 88. Thus, when the tool 28b is inserted into the open tool holder 138, the inner face 36b on the presetting nut 24b engages the ejector flanges 108b and initiates leftward (as viewed in FIG. 5) movement of the ejector sleeve 110b and latch slide 114b while the sleeve 34b is retained against movement by the locking assembly 94b. Once the chamfer surface 20b on the axially outer face 22b of the presetting nut 24 has moved inwardly of the truncated conical gripping surfaces 30b, the retaining balls 98b move into the groove 120b and the latch slide 114b is released for leftward movement to the locking position shown in FIG. 5. During this movement of the actuator sleeve 34b, the gripping surfaces 30b on the outer end portions 42b of the collet fingers 32b are pressed against the chamfer 20b to hold the presetting nut 24b against the reference surface 38b on the end of the spindle 12b and to retain the tool 28b against axial movement relative to the spindle 12b during machining operations.

Under certain circumstances, it may be desirable to connect a toolholder of the same general construction as shown in FIGS. 3-5 with a machine tool spindle without modifying either the spindle or the presetting nut on tools which are held by the toolholder. In this case, the ejector flange would be located between the presetting nut and the outer end of the spindle and the reference surface would be formed by the axially outer surface of the ejector flange. Therefore, the axial extent of the ejector flange would have to be compensated for in locating the presetting nut relative to the shank of a tool. Such a tool-holder 150 is shown in FIG. 6 and includes many components which are similar to those shown in FIGS. 3-5. To avoid prolixity of description, the components of FIG. 6 have been designated with the same numerals utilized to designate similar components in FIGS. 3-5, the suffix letter "c" being associated with the numerals of FIG. 6 to avoid confusion.

The toolholder 150 includes an ejector sleeve 110c having an annular ejector flange 108c which is disposed between an end sruface 38c of a spindle 12c and an inner face 36c on the presetting nut 24c. In this embodiment of the invention an annular outer surface 152 on ejector flange 108c forms the reference surface for positioning the tool 28c relative to the spindle 12c. Since the ejector flange 108c is located between the inner face 36c of the presetting nut 24c and the end surface 38c of the spindle 12c, the presetting nut 24c is located axially outwardly on the shank 26c from a position which would have if the inner face 36c of the presetting nut 24c was disposed in abutting engagement with the end surface 38c of the spindle 12c in a manner similar to that shown in FIGS. 1-5. Although this embodiment of the invention requires that the thickness of the ejector flange 108c be compensated for in locating the presetting nut 24c on the tool shank 26c, the toolholder 150 can be associated with an existing spindle 12c and tools 28c without substantially modifying either of them.

The embodiment of the invention shown in FIG. 7 is generally the same as shown in FIG. 5. However, in this embodiment of the invention a relatively small bevel or chamfer 160 is provided on the outer end of the spindle to receive the ejector flange. Since the embodiment of the invention illustrated in FIG. 7 is substantially the same as has been illustrated in FIG. 5, similar numerals will be utilized to designate similar components, the suffix letter "d" being associated with the numerals of the embodiment of FIG. 7 to avoid confusion.

The ejector flange 108 of an ejector assembly 90d is disposed in an annular beveled groove 160 formed in the outer end of the spindle 12d. When the collet 14d is in the closed condition of FIG. 7, truncated conical surfaces 30d on collet fingers 32d grippingly engage a chamfer 20d on the outer face 22d of a presetting nut 24d. When the collet 14d is opened, the resiliently deflectable collet fingers 32d spring outwardly to release the presetting nut 24d. Thereafter, the ejector slide 110d is moved outwardly to press the annular ejector flange 108 against the inner face 36d of the presetting nut 24d and move the presetting nut and shank 26d outwardly relative to the spindle 12d.

In view of the foregoing description, it can be seen that a toolholder constructed in accordance with the present invention includes a collet 14 having resilient fingers 32 which are pressed into gripping engagement with the outer face 22 of a presetting or adjusting nut 24 on a shank 26 of a tool 28 to retain an inner face 36 of the presetting nut in abutting engagement with a reference surface during machining operations. In accordance with one feature of the present invention, the collet includes resiliently deflectable gripper fingers 32 having surfaces 30 which, when the collet is closed, are disposed in planar abutting engagement with the chamfer surface 20 and form a portion of a cone which is coincident with a cone extending through the chamfer. In the embodiments of the invention illustrated in FIGS. 3-7, an ejector assembly is provided to move the tool outwardly relative to the spindle when the collet is opened. In addition, a locking or latching assembly is provided to retain the collet in the open condition until another tool is inserted into the collet.

I claim:

1. An apparatus for holding tools having a shank with a presetting nut disposed thereon for engaging a reference surface to determine the extent to which the shank projects from a spindle socket, said apparatus comprising collet means operable between an open position and a closed position grippingly engaging the presetting nut, said collet means including a base fixedly connected with the spindle and a plurality of resiliently deformable gripper fingers extending axially outwardly from said base and having outer end portions which are disposed in engagement with a truncated conical surface on an axially outermost face of the presetting nut when said collet is in the closed condition, said outer end portions of said gripper fingers defining a circular opening through which at least a portion of said presetting nut moves to bring a radially extending surface on an axially innermost face of said presetting nut adjacent to the reference surface when said collet means is in open condition, said outer end portions of said gripper fingers each including an arcuate inner surface disposed on an inner side of the associated gripper finger and which is positioned in abutting planar engagement with the truncated conical outer surface of the presetting nut and forms a portion of a first cone which is coaxial with the shank of the tool when said collet means is in the closed condition, said outer end portions of said gripper fingers each including an arcuate outer surface disposed on an outer side of the associated gripper finger and which forms a portion of a second cone which is coaxial with the first cone, actuator means for effecting operation of said collet means between the open and closed positions, said actuator means including an axially movable sleeve circumscribing said gripper fingers, said sleeve including a truncated conical inner surface means disposed in a coaxial relationship with said second cone for camming said outer end portions of said resilient gripper fingers inwardly to operate said collet means from the open condition to the closed condition, and resilient means for applying a biasing force to said sleeve when said collet means is in the closed position to press said truncated conical inner surface of said sleeve against said arcuate outer surfaces of said gripper fingers and to maintain said arcuate inner surfaces of said gripper fingers in pressure engagement with the truncated conical outer surface of the presetting nut.

2. An apparatus as set forth in claim 1 further including tool ejector means for moving the innermost face of the presetting nut away from the reference surface upon operation of said collet means from the closed position to the open position.

3. An apparatus as set forth in claim 1 further including means for moving the innermost face surface of the presetting nut and the reference surface axially outwardly relative to the spindle socket upon operation of said collet means from the closed position to the open position.

4. An apparatus for holding tools having a shank with a presetting nut disposed thereon for engaging a reference surface to determine the extent to which the shank projects from a spindle, said apparatus comprising a collet adapted to be connected with a spindle and operable between an open condition and a closed condition in which said collet engages a surface on an axially outer face of the presetting nut and presses an axially inner surface on the presetting nut against the reference surfaces, said collet including gripper means for abuttingly engaging the surface on the axially outer face of the presetting nut, said gripper means including a base adapted to be fixedly connected to the spindle and a plurality of resiliently deflectable gripper fingers extending axially outwardly from said base, each of said gripper fingers including an inner surface, and actuator means for effecting operation of said collet between the open condition and the closed conditions, said actuator means including means for deflecting said gripper fingers inwardly toward the presetting nut to press said inner surfaces on said gripper fingers into abutting engagement with the surface on the axially outer face of the presetting nut upon operation of said collet to the closed condition.

5. An apparatus as set forth in claim 4 wherein said actuator means is operable from a first condition to a second condition to enable said gripper fingers to flex radially outwardly away from the presetting nut and thereby effect operation of said collet from the closed condition to the open condition, said apparatus further including means for moving the tool axially outwardly relative to the spindle socket in response to operation of said actuator means from the first condition to the second condition.

6. An apparatus as set forth in claim 4 wherein said gripper fingers define a circular opening having a diameter which is greater than the maximum external diameter of the presetting nut when said collet is in the open condition to enable the presetting nut to pass through the opening, and wherein said gripper fingers define a circular opening having a diameter which is less than the maximum external diameter of the presetting nut when said collet is in the closed condition to enable said gripper fingers to retain the presetting nut against movement through the opening when said collet is in the closed condition.

7. An apparatus as set forth in claim 4 wherein said actuator means is operable from a first condition to a second condition to effect operation of said collet from the closed condition to the open condition, said apparatus further including releasable locking means for retaining said actuator means in the second condition and said collet in the open condition, and means for releasing said locking means in response to the insertion of a tool into said collet to enable said actuator means to operate to the first condition and thereby effect operation of said collet to the closed condition.

8. An apparatus as set forth in claim 4 further including tool ejector means for moving a tool axially outwardly upon operation of said collet from a closed condition to an open condition.

9. An apparatus as set forth in claim 8 wherein said tool ejector means includes pusher means for engaging the presetting nut and spring means for urging said pusher means outwardly to move the tool outwardly under the influence of outwardly directed forces transmitted from said pusher means to the presetting nut.

10. An apparatus as set forth in claim 9 wherein said pusher means includes surface means for abuttingly engaging a radially extending surface on the presetting nut at a location radially outwardly of the axially inner surface on the presetting nut.

11. An apparatus as set forth in claim 9 wherein said pusher means includes surface means for abuttingly engaging the axially inner surface on the presetting nut at a location radially outwardly of the reference surface.

12. An apparatus as set forth in claim 9 wherein said pusher means includes a radially inwardly projecting portion which is disposed between said reference surface and the presetting nut when said collet is in the closed condition engaging the presetting nut.

* * * * *

UNITED STATES PATENT OFFICE
CERTIFICATE OF CORRECTION

Patent No. 3,790,182          Dated February 5, 1974

Inventor(s) Ralph H. Schuman

It is certified that error appears in the above-identified patent and that said Letters Patent are hereby corrected as shown below:

Column 9, line 47, please change "surfaces" to --surface--.

Signed and sealed this 7th day of May 1974.

(SEAL)
Attest:

EDWARD M. FLETCHER, JR.
Attesting Officer

C. MARSHALL DANN
Commissioner of Patents